DONALD E. MARSHALL, JR.
ALBERT T. PICCIRILLI
INVENORS
BY Alfred H. Rosen
Thomas N. Tarrant
ATTORNEYS DONALD E. MARSHALL. JR
ALBERT T. PICCIRILLI
INVENTORS
BY [signature]
ATTORNEYS INVENTORS
DONALD E. MARSHALL JR.
ALBERT T. PICCIRILLI
BY, Alfred Kuntz
Thomas N. Tarrant
ATTORNEYS United States Patent Office 3,430,070

Patented Feb. 25, 1969

3,430,070

FLIP-FLOP CIRCUIT

Donald E. Marshall, Jr., Framingham, and Albert T. Piccirilli, Medfield, Mass., assignors by mesne assignments, to Honeywell Inc., a corporation of Delaware Filed Feb. 17, 1965, Ser. No. 433,339

U.S. Cl. 307—247 18 Claims

Int. Cl. H03k 17/60

ABSTRACT OF THE DISCLOSURE

The provision in a flip-flop of two additional transistors, each arranged with its collector-emitter path in parallel with a junction of a different one of the two cross-coupled transistors forming the flip-flop, enables a pulse applied to the base of either additional transistor to switch the flip-flop and still maintain the same output signal from it until the pulse terminates. A dual rank flip-flop employing this arrangement in its master flip-flop has a short setup time, making possible switching with short pulses. Further, a single transistor in each of the two interconnections between the main and slave flip-flops in a dual rank flip-flop both couples the state of the main flip-flop to control the slave flip-flop and constrains both flip-flops to a desired state in response to external signals.

This invention is related to operational flip-flops for use in digital computer circuitry and in particular to a double ranked flip-flop in which two complementary outputs are controlled by various forms and arrangements of inputs.

In listing the desirable features for computer circuitry, the order of value might well be as follows: reliability, speed, size and cost. Circumstances might find variations in this order. Some of these features can be further broken down. For example, reliability can include stability, freedom from failure and ease of repair. Cost can include original cost, power consumption, and cost of maintenance including repair. In designing computer circuitry, it is repeatedly found that optimizing any one of these features results in deterioration of one or more other features. Thus an improvement in speed will reduce reliability and increase cost and size. Similarly an increase in reliability will reduce speed and increase cost and size.

The present optimum in size is obtained by use of monolithic modules. Monolithic modules are most economically produced by maintaining uniformity in modules even though utilized in different ways. Flexibility of a circuit is thus important. A further desired aim in monolithic technology is the elimination of capacitors to the extent possible. Capacitors are difficult to produce in monolithic chips and are often tied on the outside of the chips increasing size and reducing manufacturing efficiency. Capacitors also tend to decrease speed, introduce instability and decrease long term reliability.

Now in accordance with the present invention a flip-flop circuit has been found which is exceptionally well suited for monolithic use in that it utilizes only semiconductor devices and resistors, has high speed, good noise immunity and flexibility in adapting to serve a number of functions without circuit modification. High speed is obtained by a novel configuration of a four transistor flip-flop master in which input transistors abruptly turn their companion transistors off by shorting the emitter-base electrodes while simultaneously inhibiting switching signal transmission from the master to the slave. Noise immunity is achieved by isolating diodes and various buffering arrangements to prevent undesired circuit interactions. One novel feature of the present invention providing stability advantages is the use of a series transistor in the emitter circuit of each side of the master flip-flop. This series transistor permits fast positive DC Set and Reset action independent of other inputs.

Flexibility for monolithic purposes is obtained by providing a single 14 lead circuit which is useful as a complex clocked gating and locking circuit with facilities for multiple Set and Reset controls as well as multiple DC Set and Reset inputs. Simplification is obtained merely by shorting the input leads for undesired inputs to the supply voltage lead or merely isolating the undesired input leads. The circuit has been arranged so that the presence of elements for unused functions has no effect on the operation of remaining functions. Thus it is an object of the present invention to define a novel double rank flip-flop.

It is a further object of the invention to define a novel high speed four transistor flip-flop.

It is a further object of the invention to define novel interconnecting circuitry between the master and slave components of a double rank flip-flop including means to establish the states of both master and slave simultaneously.

It is still a further object of the present invention to define a novel double rank flip-flop in which the slave flip-flop provides a full output swing with fewer circuit elements than used in the prior art.

Further objects and features of the invention will be understood upon reading the following description together with drawings in which.

Figure 1:
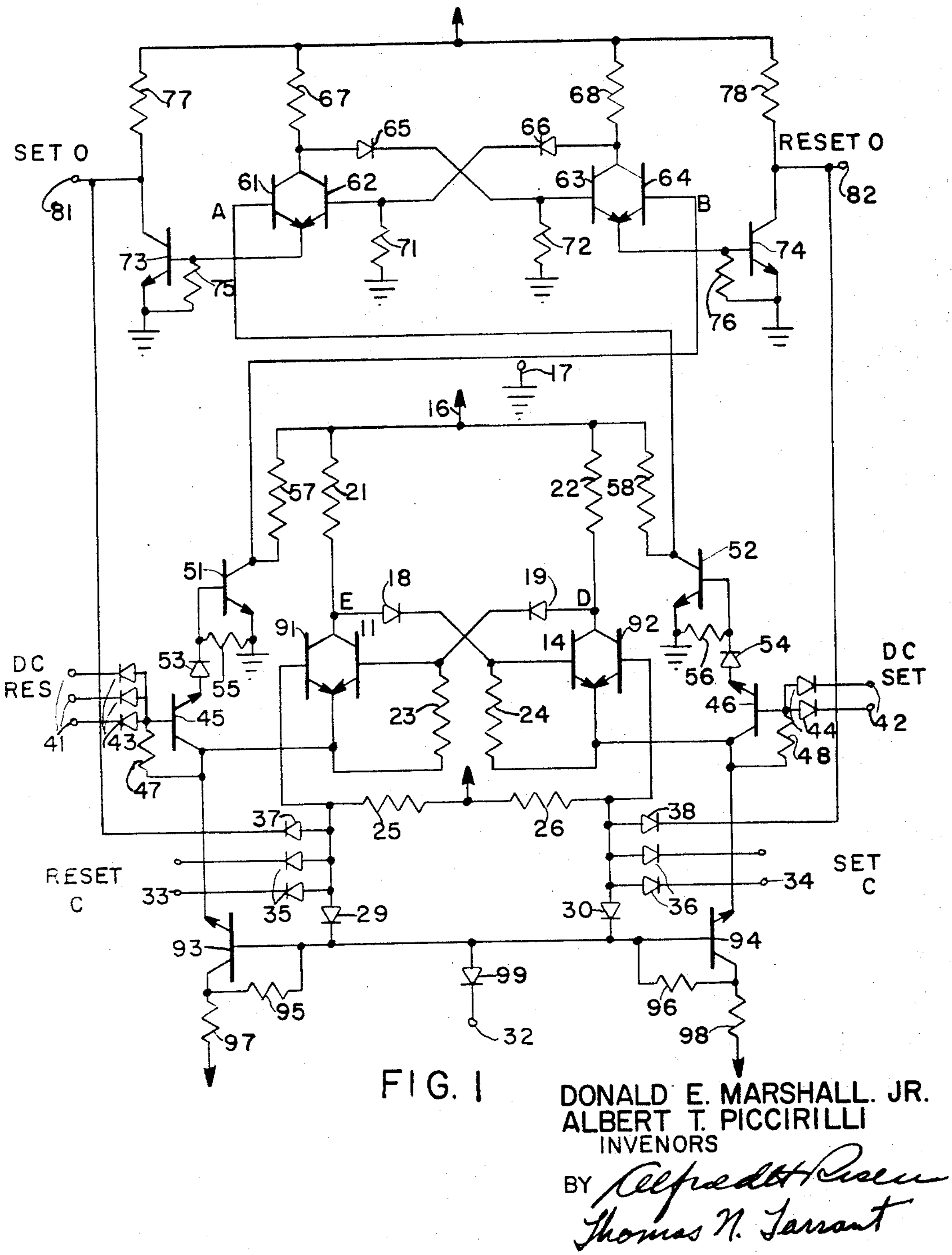
FIG. 1 is a schematic diagram of a double rank flip-flop in accordance with the invention utilizing novel interconnecting circuitry between the master and slave inputs.
Figure 2:
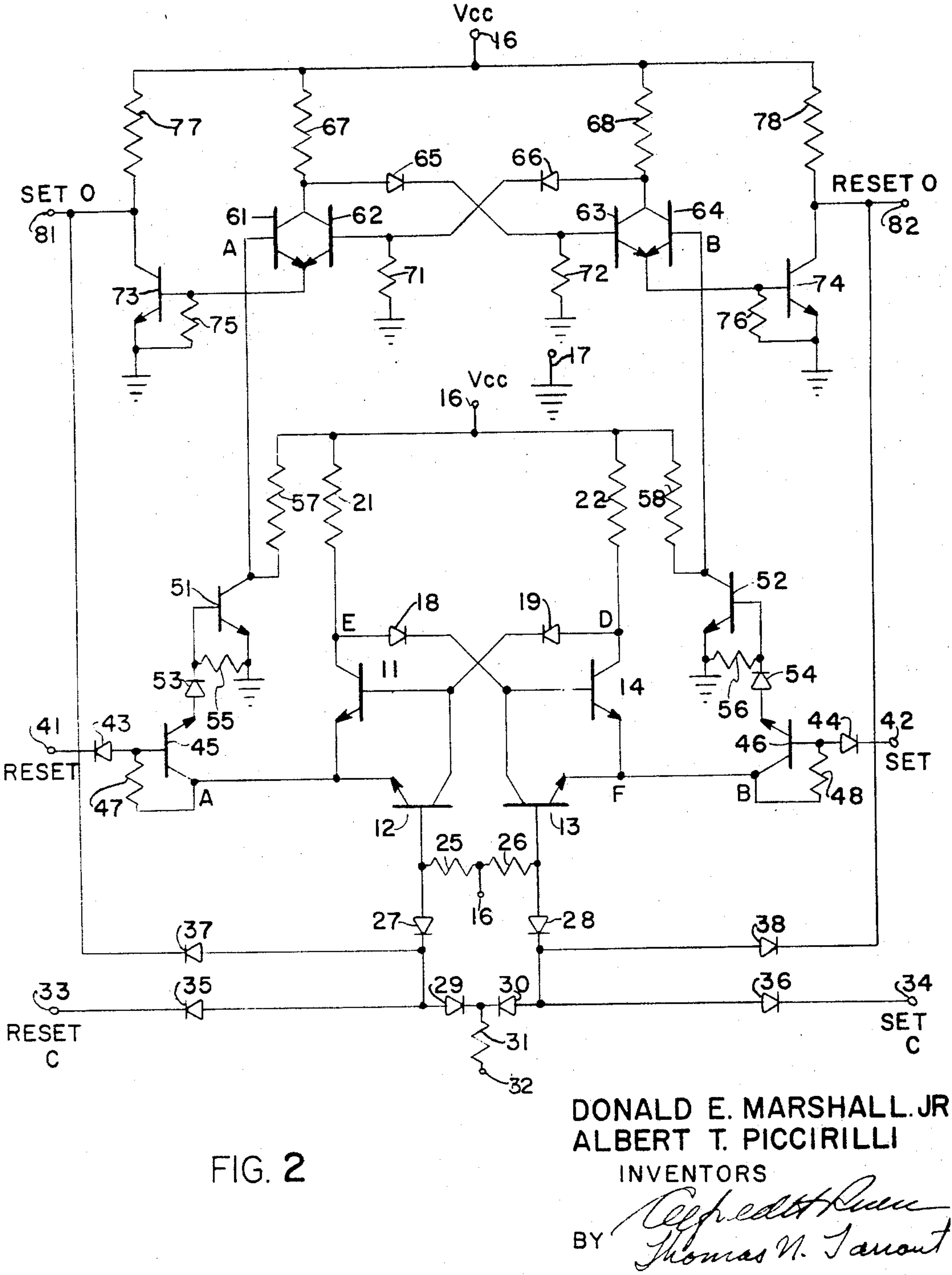
FIG. 2 is a schematic diagram of a double rank flip-flop in accordance with the invention in which a novel high speed master flip-flop is used.
Figure 3:
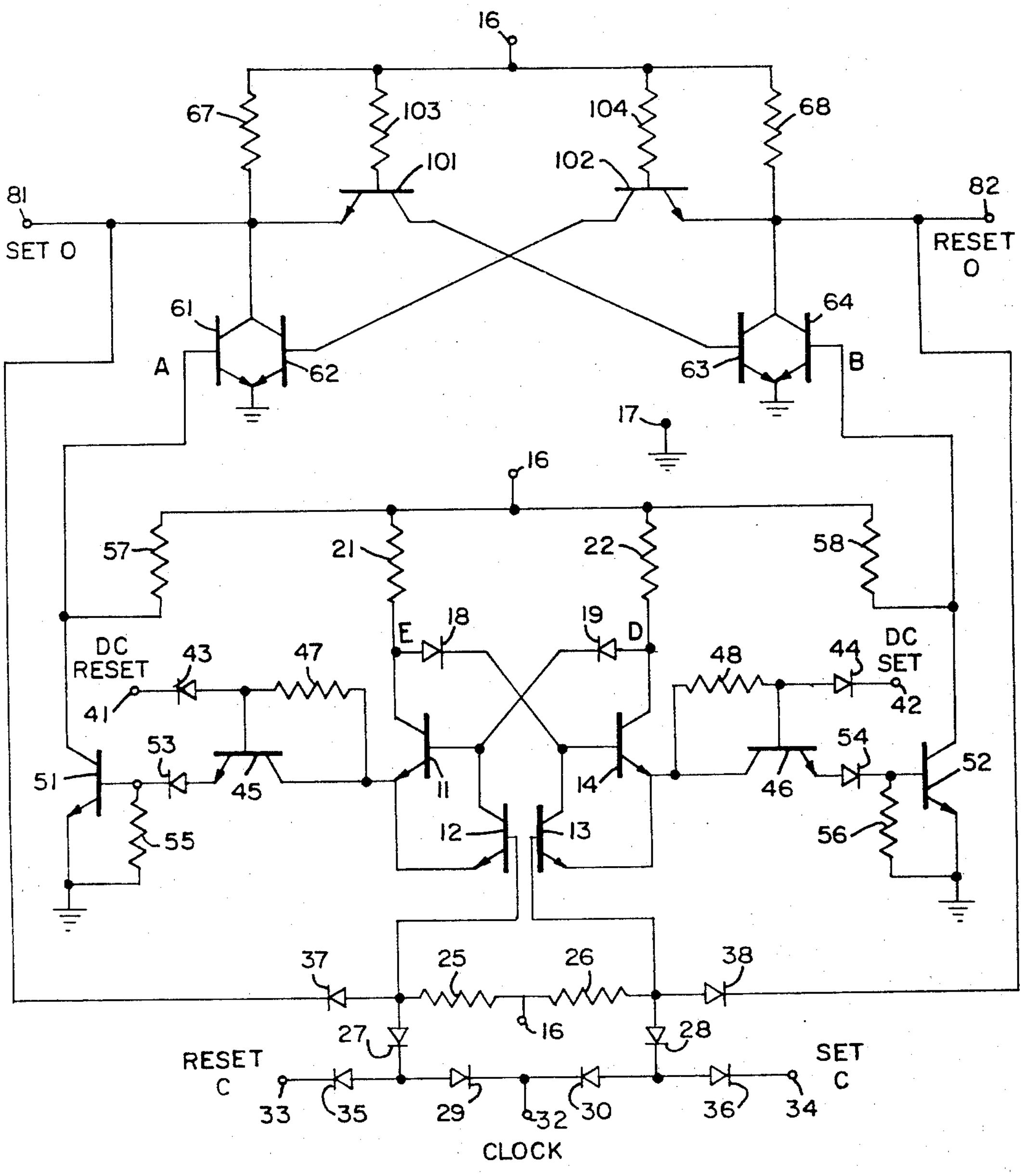
FIG. 3 is a schematic diagram of a double rank flip-flop in accordance with the invention providing a substantial decrease in the number of circuit elements.

The inventive flip-flop is described in relation to three specific embodiments as illustrated in FIGS. 1, 2 and 3. Each successive figure represents features of particular improvement over the preceding figure with a reduction in the number of necessary components. FIG. 1 shows connections for fourteen different leads representing a standard for monolithic circuits. It will be recognized that the input gates can comprise a plurality of parallel inputs. The additional inputs have been left out of FIGS. 2 and 3 in the interest of descriptive simplicity. Resistor values may be moved over a wide range and specific values are not part of this invention.

Referring now to FIG. 1, the flip-flop consists of two bistable circuits, one of which may be called the "master flip-flop" comprising transistors 11, 14, 91 and 92 and the other of which may be called the "slave flip-flop" comprising transistors 61, 62, 63 and 64. This breakdown is widely known and puts the flip-flop in a class known as "Double Rank Flip-Flops."

The master flip-flop of FIG. 1 is comprised of two pairs of transistors. Transistors 91 and 11 are connected with their collectors directly connected to a single load resistor 21 at a point E and their emitters directly connected to the collector of transistor 45 in series with the output. Transistors 14 and 92 are connected with their collectors directly connected to a single load resistor 22 at a point D and their emitters directly connected to the collector of transistor 46 in series with the output. The two pairs of transistors are cross-coupled with point E connected to the base of transistor 14 by means of a diode 18 and point D connected to the base of transistor 11 by means of a diode 19. Biasing resistors 23 and 24 are connected between the base and emitter of transistors 11 and 14 respectively.

The master flip-flop is connected to a voltage source supply terminal 16 through load resistors 21 and 22. Major current paths through the master flip-flop between reference terminal 17 and voltage supply source terminal 16 are provided by diodes 53 and 54 and resistors 55 and 56 connected to the emitters of transistors 45 and 46 respectively. Transistors 51 and 52 connected between reference 17 and the base electrodes of transistors 64 and 61 provide part of the current paths for the master flip-flop. Resistors 55 and 56 supply biasing between the base electrodes and the emitter electrodes of transistors 51 and 52. The emitter electrodes of transistors 51 and 52 are directly connected to reference 17 and the collector electrodes are connected through load resistors 57 and 58 respectively to source terminal 16. The collector electrodes of transistors 51 and 52 are also connected directly to the inputs of the slave flip-flop to control the operation of the slave flip-flop. Transistors 91 and 92 are the input transistors of the master flip-flop and are controlled by input AND gates. Source terminal 16 is connected to the base electrodes of transistors 91 and 92 through load resistors 25 and 26 respectively. The gating function is provided by diodes connected directly to the base electrodes of transistors 91 and 92. Diodes 35 and 36 connected to the base electrodes of transistors 91 and 92 respectively and terminals 33 and 34 for connection to Reset and Set controls respectively. Diodes 29 and 30 are jointly connected to a further diode 99 and a terminal 32 for a clock signal. Diodes 37 and 38 are connected to outputs 81 and 82 of the slave flip-flop providing feedback information.

The common junction of diodes 99, 29 and 30 is further connected to the bases of two transistors 93 and 94. The collectors of transistors 93 and 94 are connected through load resistors 97 and 98 respectively to supply terminal 16. Biasing resistors 95 and 96 are connected between the base and collector electrodes of transistors 93 and 94 respectively. The emitters of transistors 93 and 94 are respectively connected to the collectors of transistors 45 and 46. The input circuits for transistors 45 and 46 are AND gates providing for DC Reset inputs and DC Set inputs respectively. Terminals 41 are provided for DC Reset inputs and terminals 42 are provided for DC Set inputs. The gates comprise resistors 47 and 48 connected between the base electrodes and the collector electrodes of transistors 45 and 46 respectively along with diodes 43 connected between input terminals 41 and the base electrode of transistor 45 and diodes 44 connected between input terminals 42 and the base electrode of transistor 46. The slave flip-flop is comprised of two pairs of transistors with collectors of transistors 61 and 62 directly connected to a common load resistor 67 and the emitters directly connected to the base electrode of transistor 73 connected as an inverter. Transistors 63 and 64 are connected with their collector electrodes directly connected to a common load resistor 68 and their emitter electrodes directly connected to the base electrode of a transistor 74 arranged as an inverter. Load resistors 67 and 68 are connected to voltage supply terminal 16.

FIG. 2 uses the identical configuration as FIG. 1 for the slave flip-flop. The interconnections between the master flip-flop and the slave flip-flop including the direct current Set and Reset circuitry and the inverters is the same except that the inputs to the slave flip-flop are reversed, that is the collector of transistor 52 is directly connected to the base of transistor 64 and the collector of transistor 51 is directly connected to the base of transistor 61. This change is due to the fact that a different form of master flip-flop is used that responds in the reverse order to an input signal from that of the master flip-flop used in FIG. 1. FIG. 2 has a measure of improvement over the circuit of FIG. 1 in the novel flip-flop configuration used for the master flip-flop. This novel flip-flop allows the elimination of two circuit elements, i.e. resistors 23 and 24, and at the same time, provides faster action than that obtainable with the flip-flop of FIG. 1. The circuitry modifications as illustrated in FIG. 2 replace transistors 91 and 92 of FIG. 1 with transistors 12 and 13. The emitter of transistor 12 is directly connected to the collector of transistor 45 jointly with the emitter of transistor 11. The emitter of transistor 13 is directly connected to the collector of transistor 46 jointly with the emitter of transistor 14. The collector of transistor 12 is directly connected to the base of transistor 11 and the collector of transistor 13 is directly connected to the base of transistor 14. The bases of transistors 12 and 13 are connected across a resistive network depicted as resistors 25 and 26 center tapped to the voltage supply terminal 16. The remaining connections of the master flip-flop are identical to those of FIG. 1 except for the deletion of resistors 23 and 24 as stated above. The input circuitry to the master flip-flop has been modified in order to reduce the number of circuit elements. Transistors 93 and 94 of FIG. 1 have been eliminated and diode 99 at the clock input has been replaced with a resistive element 31 to protect the clock from overloading. The remainder of the input circuitry is the same except that diodes 27 and 28 connected to the bases of transistors 12 and 13 respectively have been added in series with the inputs and inside the feedback loops from output terminals 81 and 82. As has been stated before, the parallel inputs for Set and Reset operations have been left out of FIGS. 2 and 3 for purposes of simplicity.

FIG. 3 has a different form of flip-flop for the slave flip-flop which is particularly advantageous for monolithic use due to the elimination of a significant number of circuit elements. The changes as compared with the slave flip-flops of FIG. 1 and FIG. 2 are in the crossover networks between the two sides of the flip-flop and in the outputs. Thus diode 65 of FIG. 1 is replaced with transistor 101 having its emitter connected directly to the joint collector electrodes of transistors 61 and 62 and its collector connected directly to the base electrode of transistor 63. The base of transistor 101 is connected to supply terminal 16 by resistor 103. Diode 66 of FIG. 1 is replaced in FIG. 3 with transistor 102 having its emitter electrode directly connected to the joint collector electrodes of transistors 63 and 64. The collector electrode of transistor 102 is directly connected to the base of transistor 62 and the base of transistor 102 is connected to supply terminal 16 by a resistor 104. The use of transistors in the crossover network of the flip-flop instead of diodes, permits a greater voltage swing at the collectors of transistors 61, 62, 63 and 64. This permits the outputs to be taken directly from these collectors eliminating the necessity of additional transistors 73 and 74 as used in FIGS. 1 and 2.

A further change illustrated in FIG. 3 is moving the anode connections of diodes 37 and 38 so that they are directly connected to the bases of transistors 12 and 13 respectively. This arrangement provides additional isolation between the feedback loops and the clock and control inputs by interposing diodes 27 and 28. Input loading is thus reduced.

The description of operation will be given specifically referring to FIG. 2. Variations from a given description for the embodiments of FIGS. 1 and 3 are considered to be obvious, but specific operative features of these other embodiments that are of particular interest will be pointed out.

The double-rank flip-flop has two stable states. Two outputs are provided, one of which is called the Set output at terminal 81 and the other of which is called the Reset output at terminal 82. One of these outputs is the logical negation of the other. The outputs are capable of driving other electronic circuits such as flip-flops, gates, etc.

The state of the flip-flop is changed by applying the proper electrical signals to the inputs. The inputs are called DC Set inputs applied at terminals 42, DC Reset inputs applied at terminals 41, Set control inputs applied at terminals 34, Reset control inputs applied at terminals 33, and clock inputs applied at terminal 32.

The level of the inputs may be described logically as the ONE level and the ZERO level. The ONE level is nominally plus $V_{cc}$ volts but may vary about this voltage and similarly the ZERO level is nominally 0 volts but may vary about this voltage. The circuit configuration is capable of toggle rates in excess of 10 megacycles.

The flip-flop is said to be in the ONE state when the Set output is at the ONE level and Reset output is at the ZERO level and is said to be in the ZERO state when the Set output is at the ZERO level and the Reset output is at the ONE level.

With the DC Set input at the ONE level and DC Reset input at the ONE level, when the DC Set input is changed to the ZERO level the flip-flop goes to or remains in the ONE state depending on its original state. This operation occurs independently of the levels of the clock and control inputs. The DC Set input may then be returned to the ONE state. Similarly with the DC Set input at the ONE level and the DC Reset input at the ONE level, when the DC Reset input is changed to the ZERO level the flip-flop goes to or remains in the ZERO state depending on its original state. This operation is also independent of the levels of the clock and control inputs. The DC Reset input may then be returned to the ONE state.

With the DC Set inputs and DC Reset inputs at the ONE level and all control inputs either at the ONE level or disconnected, when the clock input is changed from the ZERO level to the ONE level and then back to the ZERO level, the flip-flop changes state (complements), independent of its initial state. The change in state occurs shortly after the clock input has changed back to the ZERO level.

With the DC Set input and DC Reset input at the ONE level and the Set control input either at the ONE level or disconnected, and the reset control input at the ZERO level, when the clock input is changed from the ZERO level to the ONE level and then back to the ZERO level, the flip-flop goes to or remains in the ONE state depending on its initial state. The change in state occurs shortly after the clock input has changed to the ZERO state.

With the DC Set input and DC Reset input at the ONE level and the Reset control input either at the ONE level or disconnected, and the Set control input at the ZERO level, when the clock input is changed from the ZERO level to the ONE level and then back to the ZERO level, the flip-flop goes to or remains in the ZERO state depending on its initial state. The change in state occurs shortly after the clock input has changed back to the ZERO state.

With the Set control input and Reset control input at the ZERO level, when the clock input is changed from the ZERO level to the ONE level and then back to the ZERO level, the flip-flop is quiescent, remaining in its initial state.

The logical capability of the flip-flop may be expanded by providing (refer to FIG. 1):

Two or more DC Set inputs, two or more DC Reset inputs, two or more Set control inputs, and/or two or more Reset control inputs.

For electrical operation of the flip-flop, consider the operation of the slave flip-flop with points A and B at or near ground potential. The slave flip-flop is quiescent, remaining in a previously established state by means of the cross-coupling network comprising resistors 67, 71, 68, 72, diodes 65, 66 and transistors 62 and 63. The state of the slave flip-flop may be changed by moving either point A or point B positive. For instance assume that transistor 62 is initially off. Transistor 63 will then be turned on by means of base current supplied from $V_{cc}$ (positive voltage) through resistor 67 and diode 65. If point A is now moved positive, transistor 61 turns on, diverting current from the transistor 63 base. Transistor 63 turns off, and its collector moves positive, turning transistor 62 on. This operation turns transistor 73 on (initially off) and turns transistor 74 off (initially on). Thus the slave flip-flop has changed state and will remain in that state if point A returns to near ground potential.

Consider the operation of the master flip-flop with the clock input 32 near ground potential (ZERO level). Transistors 12 and 13 will be turned off since their base potentials will be more negative than their emitter potentials. Also assume that all DC Set inputs and DC Reset inputs are near $V_{cc}$ potential (ONE level) so that diodes 43 and 44 are turned off and transistors 45 and 46 are turned on by base current applied through resistors 47 and 48 respectively. Under these conditions the network of resistors 47, 48, 21 and 22, diodes 18 and 19 and transistors 11 and 14 forms the cross-coupling circuit by which the master flip-flop remains in a previously established state.

Let the clock input now change to a potential near $V_{cc}$ (ONE level), assume that the flip-flop is in the ONE state (Set output at ONE level, Reset output at ZERO level) and that the Set control inputs and Reset control inputs are disconnected. Any disconnected inputs may be considered as "ONES." Diodes 29 and 30 turn off, transistor 13 remains off since its base is maintained at a low potential by diodes 28 and 38 which are connected to the Reset output. Diodes 37 and 27 are turned off since the Set output is near $V_{cc}$ potential, therefore the base of transistor 12 moves positive turning transistor 12 on. Transistor 12 saturates, turning transistor 11 off. Current is supplied through resistor 25, transistor 12, transistor 45 and diode 53 to the base of transistor 51 and transistor 51 is held on. The collector of transistor 11 moves positive since transistor 11 is turned off and therefore current is supplied to the base of transistor 14 through resistor 21 and diode 18 turning it on. With transistor 14 on, current is supplied to the base of transistor 52 through resistor 22, transistor 14, transistor 46 and diode 54 turning it on. Thus the master flip-flop has changed state, and both transistor 51 and 52 are turned on so that points A and B are both near ground.

Now let the clock input return to a potential near ground. Transistor 12 turns off, transistor 11 remains off so that transistor 51 turns off and point A moves positive and, as previously explained, the slave flip-flop changes state. Thus the slave flip-flop changes states when the clock makes a ONE to ZERO transition.

Operation is similar when the flip-flop is initially in the ZERO state and the clock input undergoes a ZERO-ONE-ZERO level transition, changing the flip-flop to the ONE state.

Note that with the flip-flop initially in the ONE state and either one of the Set control inputs at the ZERO state, transistor 12 would not turn on and the flip-flop would have remained in the ONE state. Similarly with the flip-flop initially in the ZERO state and either of the Reset control inputs at the ZERO state, transistor 13 would not turn on and the flip-flop would have remained in the ZERO state.

Considering the flip-flop in the ONE state, all DC Reset inputs at the ONE level, let a DC set input change from the ONE state to the ZERO level (potential near ground). The base of transistor 45 moves sufficiently negative to turn transistor 45 off. Current cannot be supplied to the base of transistor 51 and transistor 51 turns off so that point A moves positive, turning transistor 61 on. Furthermore the current through resistor 47 is not sufficient to maintain the emitter of transistor 11 at its initial value. Thus the collector of transistor 11 moves positive, and current is supplied to the base of transistor 14 through diode 18 and resistor 21 turning it on. Note that this occurs independently of the levels of the clock and control inputs. This in turn moves the collector of transistor 14 negative, turning transistor 11 off and also supplies current through resistor 22, transistors 14 and 46 and diode 54 to the base of transistor 52 turning it on. Point B therefore assumes a potential near ground. Thus the slave flip-flop has changed state and the flip-flop is therefore switched to the ZERO state.

Operation is similar when the flip-flop is initially in the ZERO state, the DC Set inputs are all at the ONE level, and one or all of the DC Reset inputs is moved to the ZERO level. The flip-flop changes to the ONE state.

The configuration of FIG. 1 uses transistors 93 and 94 to allow level control switching when the clock is in the ONE state guaranteeing that the slave flip-flop will not change state while this action takes place.

The configuration of FIG. 2 reduces the number of circuit elements needed in the master flip-flop eliminating resistors 23 and 24 while at the same time providing faster DC Set and DC Reset action. This speed increase is due to more rapid turn-on of transistors 11 and 14 when transistors 46 and 45 respectively are turned off. It came as a surprise that resistors 23 and 24 weren't necessary in the FIG. 2 arrangement and this was only realized after operating the circuit of FIG. 2 for a time with the resistors present.

In FIGS. 1 and 2, the voltage swing at the collectors of transistors 62 and 63 is limited by voltage drops in the crossover network. Thus, by way of example, as the collector of transistor 62 swings positive, diode 65 and the base emitter diodes of transistors 63 and 74 are forward biased and the voltage at the collector of transistor 62 cannot exceed the sum of the voltage drops across these forward biased junctions. This prevents the voltage at the collector of transistor 62 from approaching full supply voltage. Transistors 73 and 74 have therefore been added to the slave flip-flop to enable full voltage swings at the output terminals. The need for the extra stage at each output has been eliminated in the configuration of FIG. 3.

In FIG. 3, transistors 101 and 102 replace diodes 65 and 66, resistors 71, 72, 75 and 76 and transistors 73 and 74 for a total saving of 6 circuit elements. For optimum operation of this circuit, it has been found preferable that transistors 101 and 102 have inverse betas equal to or less than 0.2. That is the current gain of the transistor, with reverse current flow between collector and emitter, is less than 0.2. The reason for this is readily observed in the operation of the circuit. Consider the condition with transistors 63 and 64 nonconducting. The voltage on the emitter of transistor 102 will be maximum.

Now a positive pulse turns transistor 64 on and the voltage on the emitter of transistor 102 starts falling. As this goes down, the base emitter bias of transistor 102 rises toward saturation so that transistor 102 acts nearly as a short circuit between the collector of transistor 63 and the base of transistor 62. The voltage on the base of transistor 62 drops along with the voltage on the emitter of transistor 102 until transistor 62 turns off. The voltage at the emitter of transistor 101 rises as transistor 62 turns off lowering the base-emitter bias of transistor 101 until transistor 101 is turned off. Some small electron flow may now pass through the emitter-base of transistor 63, through transistor 101 from collector to emitter and prevent the voltage at the collector of transistor 62 from rising to full source voltage. However with transistor 101 having an inverse beta of no more than 0.2, electron flow through transistor 101 will be insubstantial and the voltage at the collector of transistor 62 can approximate full supply voltage.

The flip-flop gating and locking circuit of the present invention is highly versatile and readily adaptable for use with a wide variety of other circuits under a wide range of operational conditions. Some of the factors involved in this are that the circuit is capable of so-called AC and DC operation since the DC Set-Reset operation is independent of AC input levels. The circuit will operate synchronously (clocked) or asynchronously (unclocked). The exclusive use of resistors, diodes and transistors makes the circuit suitable for monolithic use. Both the input loading and input noise susceptibility are believed to be less than any commercially available flip-flop with similar capabilities. Reliability is apparent in that the ZERO input level nominally 0 volts may be increased in excess of plus 1.35 volts at 25 degrees centigrade without adversely affecting the operation.

While the invention has been described in relation to specific embodiments thereof, these are not intended to be limiting, but it is intended to cover the invention broadly within the spirit and scope of the appended claims.

What is claimed is:

1. A steerable transistor flip-flop comprising:

(a) first, second, third and fourth transistors each having a base electrode, a collector electrode and an emitter electrode;

(b) first and second terminals for connection across a voltage source;

(c) circuit means forming separate connections between said first terminal and the collector electrodes of said first and fourth transistors;

(d) circuit means forming a connection between the collector electrode of said first transistor and the base electrode of said fourth transistor;

(e) circuit means forming a connection between the collector electrode of said fourth transistor and the base electrode of said first transistor;

(f) circuit means forming a direct current connection between the base electrode of said first transistor and the collector electrode of said second transistor;

(g) circuit means forming a direct current connection between the base electrode of said fourth transistor and the collector electrode of said third transistor;

(h) a logic network having plural input terminals and arranged to respond to signals at said input terminals to apply signals, for switching said first and fourth transistors according to the values of said input terminal signals, to at least one base electrode of said second and third transistors; and (i) output circuit means for connecting output loads between said second terminal and the emitter electrodes of both said first and second transistors, and between said second terminal and the emitter electrodes of both said third and fourth transistors.

2. In a double rank flip-flop comprising a master flip-flop with a plurality of Set and Reset control inputs and a clock input, a slave flip-flop, and interconnecting circuitry for transferring information from said master to said slave, and wherein initiation of first and second signals at said inputs switches the state of said master flip-flop respectively to Set and Reset states, the combination of:

(a) first means (1) in circuit with said inputs, with said master flip-flop, and with said interconnecting circuitry, and (2) responding to both said first and second signals to deliver to said interconnecting circuitry substantially the same signals said interconnecting circuitry received from said master flip-flop prior to being switched by said first and second signals, so that said slave flip-flop remains unswitched when said switching of said master flip-flop occurs, and (b) second means (1) connected with said interconnecting circuitry, (2) having at least two further input terminals for receiving further input signals, and (3) responding to said further input signals to establish selectively the state of both said master and said slave flip-flops irrespective of said signals at said control inputs and said clock input.

3. A bistable flip-flop comprising a first transistor, a second transistor, a cross-coupling network there between for taking said first transistor out of conduction when said second transistor is conducting and vice versa, an output terminal means connected to said first transistor and switching means connected with said first transistor and responding to an input flip-flop-switching signal for simultaneously switching said first transistor out of conduction and maintaining the signal at said output constant.

4. In a double rank flip-flop comprising a master flip-flop with a plurality of Set and Reset control inputs, a clock input and two outputs, a slave flip-flop having two inputs, and interconnecting circuitry between each of said two outputs of said master flip-flop and a respective one of said inputs of said slave flip-flop, and wherein said master flip-flop has a path of major current flow unique to each state thereof, the combination in each said interconnecting circuitry comprising:

(a) first switch means connected with an output of said master and responsive to electrical signals for opening the signal paths between said master and said slave and simultaneously opening one path of major current flow through said master;
(b) second switch means in series with said first switch means for inverting and amplifying signals flowing in said interconnecting circuit; and
(c) third switch means connected between said second switch means and an input of said slave for inverting said signals in said interconnecting circuit and isolating said slave from secondary effects of said signals whereby actuating said first switch means in one interconnecting circuit will establish each of said master and said slave in a selected state irrespective of the previous states, independent of the switching action of each other and irrespective of input signals to said master.

5. In a dual rank flip-flop having a master flip-flop with first and second cross-coupled semiconductor switches, a slave flip-flop with third and fourth cross-coupled semiconductor switches and input terminal means, and a pair of interconnecting circuit means each of which couples signals corresponding to the state of one said switches in the master flip-flop to said input terminal means of said slave flip-flop, the improvement of (a) a pair of further transistors
  (1) each connected at one electrode selected from the emitter or collector electrodes thereof with the master flip-flop for changing the state thereof and further connected at the other such electrode with one interconnecting circuit means to apply a signal thereto for controlling the state of said slave flip-flop,
  (2) each responsive to the initiation and presence of a selected input pulse applied to the base thereof to switch said master flip-flop from a prior state to a new state and to operate said interconnecting circuit means to maintain said slave flip-flop in a state corresponding to said prior state of said master flip-flop, and
  (3) each responsive to the termination of said pulse to operate said interconnecting means to switch said slave flip-flop to a state corresponding to said new state of said master flip-flop.

6. In a double rank flip-flop, the combination according to claim 4 in which each said switch means comprises a transistor.

7. In a double rank flop-flip comprising a master flip-flop having cross-coupled transistors and having control inputs and a clock input and two outputs, a slave flip-flop having two inputs, and interconnecting circuitry between said outputs of said master flip-flop and said inputs of said slave flip-flop, the interconnecting circuitry improvement wherein:

(a) each of first and second interconnecting transistors has a collector electrode in circuit with a different output of said master flip-flop,
(b) each of first and second circuit means couples the emitter electrode of the same-numbered interconnecting transistor to a different input of said slave flip-flop,
(c) each of first and second biasing elements is connected between the collector and base electrodes of the same-numbered interconnecting transistor,
(d) each of first and second control transistors has the collector-emitter path thereof in parallel with the base-emitter junction of one of said cross-coupled transistors in said master flip-flop, and
(e) each interconnecting transistor is arranged with said same-numbered biasing element and circuit means to apply a flip-flop switching signal to an input of said slave flip-flop in response to either the signal at its base electrode or the signal at its collector electrode.

8. A transistor flip-flop comprising:

(a) first, second, third and fourth transistors each having a base electrode, a collector electrode and an emitter electrode;
(b) first and second terminals for connection across a voltage source;
(c) circuit means forming separate resistive connections between said first terminal and the collector electrode of each of said first and fourth transistors;
(d) unilateral circuit means in circuit between the collector electrode of said first transistor and the base electrode of said fourth transistor;
(e) unilateral circuit means in circuit between the collector electrode of said fourth transistor and the base electrode of said first transistor;
(f) means forming a direct current connection between the base electrode of said first transistor and the collector electrode of said second transistor;
(g) means forming a direct current connection between the base electrode of said fourth transistor and the collector electrode of said third transistor;
(h) first and second input circuit means connected to the base electrodes of said second and third transistors respectively;
(i) a first output stage connected to the emitter electrodes of said first and second transistors in common;
(j) a second output stage connected to the emitter electrodes of said third and fourth transistors in common; and,
(k) terminal means arranged so that output loads can be connected between each said output stage and said second terminal.

9. A double rank flip-flop gating and locking circuit constituted entirely of resistive and semiconductive elements comprising:

(a) a master flip-flop in a symmetrical arrangement of two similar sides, one side of which comprises:
  (1) first, second, third and fourth transistors each having a base electrode, a collector electrode and an emitter electrodes;
  (2) means forming a resistive connection between the base electrode of said first transistor and a first voltage supply terminal;
  (3) means forming a direct current connection between the emitter electrodes of said first and second transistors;
  (4) means forming a direct current connection between the collector electrode of said first transistor and the base electrode of said second transistor;
  (5) means forming a direct current connection between the emitter electrode of said second transistor and the collector electrode of said third transistor;
  (6) means forming a direct current connection between the emitter electrode of said third transistor and the base electrode of said fourth transistor;
  (7) means forming a direct current connection between the emitter electrode of said fourth transistor and a second supply voltage terminal;
  (8) means forming a direct current connection between the collector electrode of said second transistor and the base electrode of the symmetrical counterpart of said second transistor;

(9) means forming a resistive connection between the collector electrode of said second transistor and said first supply voltage terminal; and,

(10) means forming a resistive connection between the collector electrode of said fourth transistor and said first supply voltage terminal;

(b) a slave flip-flop in a symmetrical arrangement of two similar sides, one side of which comprises:

(1) fifth and sixth transistors each having a base electrode, a collector electrode and an emitter electrode;

(2) means forming a direct current connection between the collector electrode of said fourth transistor and the base electrode of said fifth transistor;

(3) means forming a direct current connection between the emitter electrodes of said fifth and sixth transistors and said second voltage supply terminal;

(4) means forming a resistive connection between the collector electrodes of said fifth and sixth transistors and said first voltage supply terminal; and, (5) a semiconductive element connected between the collector electrode of said sixth transistor and the base electrode of the symmetrical counterpart of said sixth transistor;

(c) two feedback circuits in pair symmetry one of which is connected between said one side of said slave flip-flop and the base electrode of said first transistor and the other of which is connected between the symmetrical counterparts of the same;

(d) a first input gate connected to the base electrode of said first transistor, and a second input gate connected to the base electrode of the symmetrical counterpart of said first transistor, each said input gate including provision for a plurality of inputs; and, (e) at least one terminal connected to the base electrode of said third transistor for applying a signal giving positive determination of the states of said master flip-flop and said slave flip-flop simultaneously.

10. In a transistor flip-flop having first and second cross-coupled transistors adapted for operation in either one of first and second stable states of conduction according to input switching signals applied thereto and having at least one output terminal means connected to an electrode of said first transistor, the combination of switching means connected to said output terminal means and responsive to said input switching signals to switch said flip-flop from said first stable state to said second stable state while simultaneously maintaining the signal at said output terminal means substantially constant.

11. A transistor flip-flop according to claim 1 wherein (a) said circuit means separately interconnecting said first terminal and the collector electrode of each of said first and fourth transistors includes a resistor in each interconnection, and (b) said circuit means separately interconnecting said collector and base electrodes of said first transistor with said base and collector electrodes respectively of said fourth transistor includes a unidirectional circuit element in each such interconnection.

12. A transistor flip-flop according to claim 1 wherein said output circuit means (a) is connected to the emitter electrodes of both said first and second transistors for connecting an output load to said first transistor and (b) is connected to the emitter electrodes of both said fourth and third transistors for connecting an output load to said fourth transistor.

13. In a double rank flip-flop comprising a master flip-flop with control inputs and a clock input and two outputs, a slave flip-flop having two inputs and interconnecting circuitry between said outputs of said master flip-flop and said inputs of said slave flip-flop, the interconnecting circuitry improvement wherein:

(a) each of first and second interconnecting transistors has a collector electrode in circuit with a different output of said master flip-flop, (b) each of first and second circuit means couples the emitter electrode of the same-numbered interconnecting transistor to a different input of said slave flip-flop, (c) each of first and second biasing elements is connected between the collector and the base electrodes of the same-numbered interconnecting transistor, (d) each of first and second input terminal means is connected to respond to a signal received thereat to apply to the base of the same-numbered interconnecting transistor a signal independent of the state of either said master flip-flop or said slave flip-flop, and (e) each interconnecting transistor is arranged with said same-numbered biasing element and circuit means to apply a flip-flop switching signal to an input of said slave flip-flop in response to either said signal at its base electrode or the signal at its collector electrode.

14. A circuit as defined in claim 13 in which said master flip-flop has a pair of cross-coupled transistors each having an emitter electrode forming said output and in circuit with the collector of one interconnecting transistor.

15. A circuit as defined in claim 5.

(a) in which each semiconductor switch in said master flip-flop is a transistor arranged to apply current to one interconnecting circuit means when that transistor is in a conduction state, and (b) in which each said further transistor is arranged with the collector-emitter junction thereof in parallel with one junction of one main flip-flop transistor and further arranged to respond to said pulse to apply current to one interconnecting circuit means in the same direction as does the main flip-flop transistor connected therewith.

16. a double rank flip-flop according to claim 9 in which said semiconductive element is a diode.

17. A double rank flip-flop according to claim 9 in which said semiconductive element is a transistor.

18. A double rank flip-flop according to claim 9 in which the inputs to each said gate comprise both a control input and a clock input.

References Cited

UNITED STATES PATENTS

| | | | |
|---|---|---|---|
| Re. 26,082 | 9/1966 | Osborne | 307—88.5 |
| 2,840,728 | 6/1958 | Hauer et al. | 307—88.5 |
| 2,916,638 | 12/1959 | Clark | 307—88.5 |
| 2,945,965 | 7/1960 | Clark | 307—88.5 |
| 3,177,373 | 4/1965 | Graham | 307—88.5 |
| 3,292,014 | 12/1966 | Brooksby | 307—88.5 |

ARTHUR GAUSS, *Primary Examiner.*

H. A. DIXON, *Assistant Examiner.*

U.S. Cl. X.R.

307—289